US010618393B2

(12) United States Patent
Matsumoto et al.

(10) Patent No.: US 10,618,393 B2
(45) Date of Patent: Apr. 14, 2020

(54) OPENABLE BODY LOCK STRUCTURE FOR AUTOMOBILE AND OPENABLE BODY LOCK METHOD FOR AUTOMOBILE

(71) Applicant: Webasto SE, Stockdorf (DE)

(72) Inventors: Kouichi Matsumoto, Hiroshima (JP); Keiji Takamatsu, Hiroshima (JP); Osamu Yoshida, Hiroshima (JP)

(73) Assignee: WEBASTO SE, Stockdorf (DE)

( * ) Notice: Subject to any disclaimer, the term of this patent is extended or adjusted under 35 U.S.C. 154(b) by 507 days.

(21) Appl. No.: 15/453,362

(22) Filed: Mar. 8, 2017

(65) Prior Publication Data

US 2017/0267082 A1 Sep. 21, 2017

(30) Foreign Application Priority Data

Mar. 18, 2016 (JP) .................................... 2016-54752

(51) Int. Cl.
| | |
|---|---|
| *B60J 7/08* | (2006.01) |
| *B60J 7/185* | (2006.01) |
| *E05B 47/00* | (2006.01) |
| *E05C 5/04* | (2006.01) |

(52) U.S. Cl.
CPC ................ *B60J 7/1851* (2013.01); *B60J 7/08* (2013.01); *E05B 47/0012* (2013.01); *E05C 5/04* (2013.01); *E05B 2047/002* (2013.01)

(58) Field of Classification Search
CPC ............ B65H 2220/11; B65H 2511/20; B65H 2220/08; G03G 21/1633; G03G 21/1647; A44B 19/267; B65D 33/2591; B65D 33/0665; Y10T 24/2534; Y10T 24/2511

See application file for complete search history.

(56) References Cited

U.S. PATENT DOCUMENTS

| | | | | | |
|---|---|---|---|---|---|
| 3,610,681 | A | * | 10/1971 | Trenkler ................... | B60J 7/106 296/218 |
| 3,666,317 | A | * | 5/1972 | Podwys .................. | B60J 7/1851 296/116 |
| 4,618,180 | A | * | 10/1986 | Muscat ................... | B60J 7/1851 292/241 |
| 4,817,999 | A | * | 4/1989 | Drew ...................... | B60J 7/1851 292/113 |

(Continued)

FOREIGN PATENT DOCUMENTS

JP 2012-121382 A 6/2012

*Primary Examiner* — Kiran B Patel
(74) *Attorney, Agent, or Firm* — Fitch, Even, Tabin & Flannery, LLP (57) ABSTRACT

An openable roof lock structure for an automobile includes an engaged member fixed to a front header, and an automatic lock device fixed to an openable roof, the automatic lock device being attachable to and detachable from the engaged member. The automatic lock device includes a hook member having a leading end portion in one end, the leading end portion to be engaged with the engaged member, and a drive part to which the other end of the hook member is coupled, the drive part turning the hook member to an upper side of a vehicle to engage the hook member with the engaged member. The hook member includes a buffering member that has elasticity and is abutted with the engaged member on the upper side of the vehicle in a state that the leading end portion is not engaged with the engaged member.

5 Claims, 9 Drawing Sheets

20···ENGAGED MEMBER  30···AUTOMATIC LOCK DEVICE  33···GEAR  34···DRIVING ARM
35···COUPLING MEMBER  36···HOOK MEMBER  36a···LEADING END PORTION  37···COIL SPRING
361···GUIDE PIN  364···BUFFERING MEMBER

1···AUTOMOBILE   9···OPENABLE ROOF   10···FRONT WINDOW GLASS
11b···FRONT HEADER   20···ENGAGED MEMBER

(56) References Cited

U.S. PATENT DOCUMENTS

| | | | | |
|---|---|---|---|---|
| 5,058,939 A * | 10/1991 | Miilu | B60J 7/1851 | 292/110 |
| 5,154,479 A * | 10/1992 | Sautter, Jr. | B60J 7/1851 | 292/114 |
| 5,413,390 A * | 5/1995 | Filippi | B60J 7/192 | 292/96 |
| 5,435,615 A * | 7/1995 | Schmitz | B60J 7/1851 | 292/113 |
| 5,957,511 A * | 9/1999 | Homann | B60J 7/1851 | 292/121 |
| 6,033,009 A * | 3/2000 | Ritter | B60J 7/0573 | 292/DIG. 5 |
| 6,036,254 A * | 3/2000 | Ritter | B60J 7/0573 | 296/103 |
| 6,158,786 A * | 12/2000 | Droste | B60J 7/1851 | 292/201 |
| 6,435,574 B1 * | 8/2002 | Taga | E05B 83/16 | 292/216 |
| 6,520,560 B2 * | 2/2003 | Schutt | B60J 7/1851 | 292/DIG. 5 |
| 6,659,532 B2 * | 12/2003 | Bon | B60J 7/1851 | 296/102 |
| 6,695,385 B1 * | 2/2004 | Lange | B60J 7/1204 | 296/107.07 |
| 7,021,696 B2 * | 4/2006 | Doncov | B60J 7/1851 | 292/DIG. 5 |
| 7,407,201 B2 * | 8/2008 | Pfertner | B60J 7/1851 | 292/201 |
| 7,861,976 B2 * | 1/2011 | Holemans | B63B 21/08 | 244/119 |
| 7,866,697 B2 * | 1/2011 | Norum | B60R 21/13 | 280/756 |
| 8,308,219 B2 * | 11/2012 | Willard | B60J 7/1265 | 296/107.09 |
| 8,424,952 B2 * | 4/2013 | Schmitt | B60J 7/198 | 296/107.08 |
| 8,511,737 B2 * | 8/2013 | Wilke | B60J 7/1851 | 292/256 |
| 8,657,360 B2 * | 2/2014 | Katrini | B60J 7/1239 | 296/107.19 |
| 9,376,845 B2 * | 6/2016 | Sawaguchi | E05D 3/022 | |
| 9,533,554 B2 * | 1/2017 | Sviberg | B60J 7/1851 | |
| 9,649,920 B2 * | 5/2017 | Snellenberg | B60J 7/1642 | |
| 10,245,929 B2 * | 4/2019 | Haberl | B60J 7/1851 | |
| 10,266,041 B2 * | 4/2019 | Rudolfi | B60J 7/1204 | |
| 2002/0185887 A1 * | 12/2002 | Hasselgruber | B60J 7/1851 | 296/121 |
| 2003/0146643 A1 * | 8/2003 | Dietl | B60J 7/1851 | 296/121 |
| 2004/0021339 A1 * | 2/2004 | Taylor | B60J 7/1851 | 296/121 |
| 2004/0046417 A1 * | 3/2004 | Guillez | B60J 7/143 | 296/121 |
| 2004/0169394 A1 * | 9/2004 | Obendiek | B60J 7/1851 | 296/121 |
| 2004/0201242 A1 * | 10/2004 | Kustner | B60J 7/1851 | 296/121 |
| 2004/0201243 A1 * | 10/2004 | Hasselgruber | B60J 7/1851 | 296/121 |
| 2008/0054672 A1 * | 3/2008 | Feussahrens | B60J 7/1855 | 296/121 |
| 2008/0122248 A1 * | 5/2008 | Neubrand | B60J 7/1851 | 296/121 |
| 2008/0122249 A1 * | 5/2008 | Habacker | B60J 7/1851 | 296/121 |
| 2008/0290688 A1 * | 11/2008 | Brockhoff | B60J 7/1851 | 296/121 |
| 2009/0091156 A1 * | 4/2009 | Neubrand | B60J 7/1851 | 296/121 |
| 2009/0179453 A1 * | 7/2009 | Schumacher | B60J 7/1851 | 296/121 |
| 2009/0236863 A1 * | 9/2009 | Akizuki | E05B 81/14 | 292/201 |
| 2010/0219659 A1 * | 9/2010 | Schumacher | B60J 7/1851 | 296/121 |
| 2010/0289292 A1 * | 11/2010 | Habacker | B60J 7/1851 | 296/121 |
| 2014/0361574 A1 * | 12/2014 | Wullrich | E05C 3/12 | 296/121 |
| 2019/0070941 A1 * | 3/2019 | Yoshida | E05B 81/18 | |
| 2019/0084392 A1 * | 3/2019 | Sawahata | B60J 7/1851 | |

* cited by examiner

1···AUTOMOBILE 9···OPENABLE ROOF 10···FRONT WINDOW GLASS
11b···FRONT HEADER 20···ENGAGED MEMBER

1···AUTOMOBILE   9···OPENABLE ROOF   10···FRONT WINDOW GLASS
11b···FRONT HEADER

FIG. 4

| 9···OPENABLE ROOF | 11b···FRONT HEADER | 20···ENGAGED MEMBER |
| 30···AUTOMATIC LOCK DEVICE | 32···DRIVE UNIT | 33···GEAR |
| 34···DRIVING ARM | 35···COUPLING MEMBER | 36···HOOK MEMBER |
| 38···PLATE SPRING MEMBER | 39···GUIDE PLATE | 361···GUIDE PIN |

OPENABLE BODY LOCK STRUCTURE FOR AUTOMOBILE AND OPENABLE BODY LOCK METHOD FOR AUTOMOBILE

CROSS REFERENCE TO RELATED APPLICATION

This application is based on, and claims priority from, Japanese Patent Application No. 2016-54752, filed on Mar. 18, 2016, the contents of which are hereby incorporated by reference in its entirety.

BACKGROUND

Technical Field

The present invention relates to an openable body lock structure for an automobile and an openable body lock method for an automobile, for coupling a retractable roof openably and closably that covers an opening of a vehicle-interior upper part to a window frame member that supports an upper part of a front window glass.

Related Art

In an automobile having a retractable roof capable of storing an upper part of a vehicle interior, in which an occupant rides, by folding the upper part in a vehicle rear direction, that is, in a so-called open car, there is provided a lock structure that couples a retractable roof which is in a state of covering the opening of the vehicle-interior upper part, to a window frame member which supports the upper part of the front window glass.

For example, JP 2012-121382 A discloses a lock structure in which, when an occupant turns an operating lever which is turnably pivotally supported in the front part of a retractable roof (roof member 9), in the vehicle front direction, a hook member (engaging member 3) turnably pivotally supported in the front part of the retractable roof turns in a vehicle upper direction in conjunction with the turning of the operating lever, so that the hook member is engaged with an engaged member (engaging hole 4) which is formed on the vehicle body that supports the upper part of the front window glass.

The hook member of JP 2012-121382 A includes a buffering part (rubber member 32) having an external shape slightly larger than a leading end portion of a substantially peg shape (hook part 33) as the leading end portion, at the leading end portion. Accordingly, according to JP 2012-121382 A, when the hook member is engaged with the engaged member, the occurrence of a noise due to contact of the engaged member with the hook member can be suppressed.

However, according to JP 2012-121382 A, in the state that the leading end portion is engaged with the engaged member, the buffering part is always pressed. Therefore, when the buffering part is made soft in order to absorb a shock caused by the engagement between the engaged member and the hook member, an unintended fatigue can easily occur in the buffering part of the lock structure in JP 2012-121382 A.

As a result, according to the lock structure of JP 2012-121382 A, a clearance between the engaged member and the leading end portion varies due to the fatigue of the buffering part, and there is a risk of the occurrence of misalignment of a relative position of the retractable roof with respect to the vehicle body.

On the other hand, when the buffering part is made hard in order to suppress a fatigue, according to JP 2012-121382 A, a shock caused by the engagement between the engaged member and the hook member cannot be sufficiently absorbed, and there is a risk of being unable to suppress the occurrence of a noise.

That is, when a buffering part is provided in the leading end portion of the hook member as described in JP 2012-121382 A, there is a problem in that misalignment of an openable body such as a retractable roof with respect to a vehicle body and a noise due to contact with the engaged member cannot be suppressed.

SUMMARY

In view of the above problems, an object of the present invention is to provide an openable body lock structure for an automobile and an openable body lock method for an automobile, each capable of suppressing misalignment of an openable body with respect to a vehicle body and a noise due to contact with an engaged member.

The present invention provides an openable body lock structure for an automobile and an openable body lock method for an automobile. The openable body lock structure includes: an engaged member fixed to one of a vehicle body and an openable body openably and closably covering an opening of the vehicle body; and a lock device fixed to the other one of the vehicle body and the openable body, and attachable to and detachable from the engaged member. The lock device includes: a substantially peg-shaped hook member having a leading end portion in one end, the leading end portion to be engaged with the engaged member; and a drive part to which the other end of the hook member is coupled and which turns the hook member in a predetermined turning direction to engage the hook member with the engaged member. The hook member includes a buffering part which has elasticity and is abutted with the engaged member in the predetermined turning direction in a state that the leading end portion is not engaged with the engaged member.

The openable body can be, for example, a retractable roof that openably and closably covers a vehicle-interior upper part, a cover or a trunk that covers a storage space in a vehicle body for storing the retractable roof, or an openable body such as a sliding door that covers an opening in a side surface of a vehicle.

The drive part can be, for example, a drive part including an electrically driven drive motor, and a link mechanism that engages a hook member with an engaged member by driving force of the drive motor, or a drive part including an operating lever that turns by receiving the operation of an occupant, and a link mechanism that engages a hook member with an engaged member in conjunction with the turning of the operating lever.

The elasticity is a characteristic of absorbing or mitigating a shock by deformation when a pressure is applied, and returning to an original shape by repulsion when the pressure is released, and refers to high resilience held by a plate spring or a low resilience held by urethane.

The buffering part can be a buffering part separate from the hook member or a buffering part integral with the hook member. The buffering part can be a buffering part made of synthetic rubber, a plate spring-shaped buffering part formed of a metal plate or a synthetic resin plate, or an elastic buffering part having low rigidity by providing a hollow portion in a corresponding part of a hook member.

According to the present invention, it is possible to suppress misalignment of an openable body with respect to a vehicle body and a noise due to contact with an engaged member.

Specifically, when the hook member having started to turn in a predetermined turning direction is engaged with the engaged member, there occur a noise due to contact of the hook member turning in the predetermined turning direction with the engaged member, and a noise due to the engagement of the leading end portion of the hook member with the engaged member.

The noise due to contact of the hook member turning in the predetermined turning direction with the engaged member easily becomes larger than the noise due to the engagement of the leading end portion with the engaged member. Consequently, discomfort given to an occupant easily becomes large.

In the state that the leading end portion is not engaged with the engaged member, by the buffering part abutted with the engaged member, the openable body lock structure for an automobile and the openable body lock method for an automobile can absorb the shock when the hook member turning in the predetermined turning direction comes into contact with the engaged member.

The openable body lock structure for an automobile and the openable body lock method for an automobile can thus suppress the occurrence of a noise due to the contact between the turning hook member and the engaged member. In this case, the noise when the leading end portion is engaged with the engaged member is audible to the occupant. However, the openable body lock structure for an automobile and the openable body lock method for an automobile can notify the occupant that the vehicle body and the openable body are completely coupled together, by the noise.

Further, in the state that the leading end portion is not engaged with the engaged member, the buffering part comes into contact with the engaged member. Therefore, the buffering part is not in contact with the engaged member in the state that the engaged member and the leading end portion are engaged together.

The openable body lock structure for an automobile and the openable body lock method for an automobile can thus prevent the buffering part from being always pressed, in the engaged state that the engaged member and the hook member are engaged together. Accordingly, the openable body lock structure for an automobile and the openable body lock method for an automobile can suppress the occurrence of a fatigue in the buffering part even when the buffering part is soft, for example.

In addition, the leading end portion of the hook member and the engaged member are in direct contact with each other. Therefore, the openable body lock structure for an automobile and the openable body lock method for an automobile can stabilize the relative position of the openable body with respect to the vehicle body even when the openable body is repeatedly opened and closed.

Therefore, the openable body lock structure for an automobile and the openable body lock method for an automobile are capable of suppressing misalignment of an openable body with respect to a vehicle body and a noise due to contact with an engaged member.

According to an aspect of the present invention, the openable body can be a retractable roof openably and closably covering an opening of an upper portion of the vehicle and being retractable into the vehicle body, the engaged member can be fixed to a window frame member supporting an upper portion of a front window glass, and the lock device can be fixed to a front end of the retractable roof.

The retractable roof can be a soft top configured with a hood cloth or a top bow, or a hard top configured with a roof made of metal or synthetic resin.

According to the present invention, since the openable body lock structure for an automobile can suppress a noise generated at a position near the occupant, it is possible to prevent discomfort from being given to the occupant.

According to an aspect of the present invention, further, the drive part can include an engagement mechanism part that engages the leading end portion with the engaged member by turning the hook member in the predetermined turning direction and sliding the hook member.

The engagement mechanism part can be, for example, an engagement mechanism part including a crank mechanism using a gear meshed with a drive motor, and a guide groove guiding movement of the hook member, or an engagement mechanism part provided with a part for biasing the hook member in a predetermined turning direction.

According to the present invention, the openable body lock structure for an automobile can suppress a noise due to contact between the engaged member and the hook member, and can shorten a time required from the start of the turning of the hook member till the engagement of the leading end portion with the engaged member.

Specifically, by the engagement mechanism part for sliding the hook member while turning the hook member in a predetermined turning direction, the openable body lock structure for an automobile can continuously perform a process of bringing the hook member in a disengaged state close to the engaged member, and a process of engaging the hook member, which is close to the engaged member, with the engaged member.

Accordingly, the openable body lock structure for an automobile can shorten the time required from the start of turning of the hook member till the engagement of the hook member with the engaged member, and can efficiently perform the engagement between the engaged member and the lock device.

In this case, the openable body lock structure for an automobile can make the leading end portion of the hook member abutted with the engaged member while maintaining the state that the buffering part is abutted with the engaged member. Therefore, the openable body lock structure for an automobile can securely prevent the occurrence of a noise due to repeated contact of the hook member with the engaged member.

Further, by providing a biasing member for biasing the hook member in a predetermined turning direction, for example, the openable body lock structure for an automobile can more securely maintain the state that the buffering part is abutted with the engaged member.

In addition, the turning speed of the hook member becomes faster by the biasing member. Therefore, the openable body lock structure for an automobile can more shorten the time required from the start of turning of the hook member till the contact of the buffering part with the engaged member, and can more efficiently perform the engagement between the engaged member and the lock device. Even in such a case, the openable body lock structure for an automobile can suppress, by the buffering part, the noise due to contact with the engaged member.

Therefore, the openable body lock structure for an automobile can suppress, by the engagement mechanism part, a noise due to contact between the engaged member and the hook member, and can shorten the time required from the start of turning of the hook member till the engagement of the leading end portion with the engaged member.

According to an aspect of the present invention, further, the drive part can be electrically driven.

According to the present invention, the openable body lock structure for an automobile can more stably suppress a noise due to contact between the engaged member and the hook member, and can more efficiently engage the hook member with the engaged member.

Specifically, as the turning speed of the hook member is faster, a noise when the hook member is in contact with the engaged member easily becomes large. Therefore, by the drive part to be electrically driven, the openable body lock structure for an automobile can turn the hook member at a constant turning speed as compared with the case where the occupant manually turns the hook member. Accordingly, the openable body lock structure for an automobile can more stabilize the shock absorption effect by the buffering part.

Further, by the drive part to be electrically driven, the openable body lock structure for an automobile can shorten and stabilize the time required from the start of turning of the hook member till the engagement of the leading end portion with the engaged member.

Therefore, by the drive part to be electrically driven, the openable body lock structure for an automobile can more stably suppress a noise due to contact between the engaged member and the hook member, and can more efficiently engage the hook member with the engaged member.

According to the present invention, it is possible to provide an openable body lock structure for an automobile and an openable body lock method for an automobile, each capable of suppressing misalignment of an openable body with respect to a vehicle body and a noise due to contact with an engaged member.

DETAILED DESCRIPTION

An embodiment of the present invention will be described with reference to the drawings.

First, an automobile 1 according to the present embodiment will be described in detail with reference to FIGS. 1 to 3.

Figure 1:
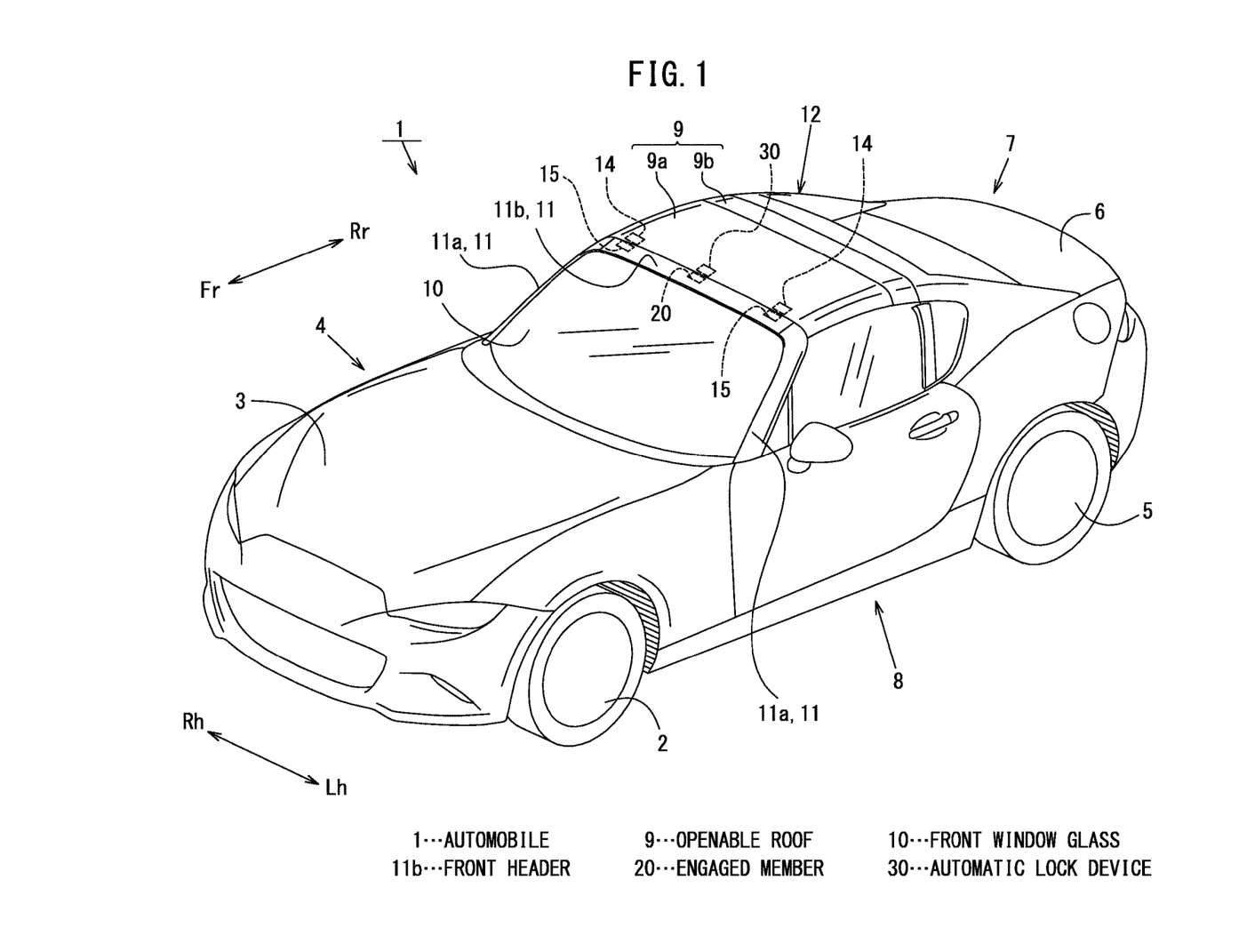
FIG. 1 is an external perspective view showing an automobile in a state that an openable roof is closed.

FIG. 1 is an external perspective view showing the automobile 1 in a state that an openable roof 9 is closed. FIG. 2 is an external perspective view showing the automobile 1 in a state that the openable roof 9 is open. FIG. 3 is a left side view showing a left side surface of the automobile 1 in a state that storing the openable roof 9 is started.

Figure 3:
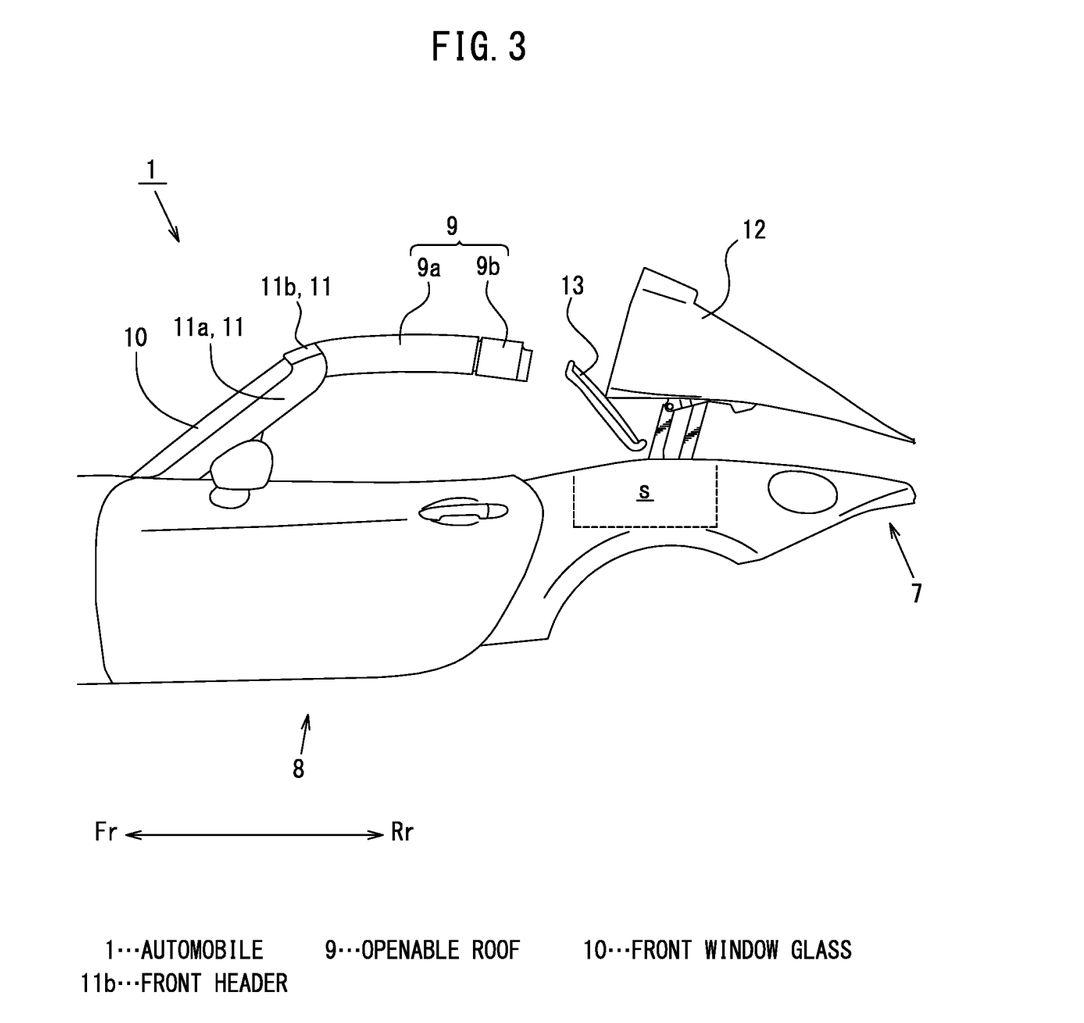
FIG. 3 is a left side view showing a left side surface of the automobile in a state that storing the openable roof is started.

In FIG. 3, in order to simplify the drawing, a storage link mechanism of the openable roof 9 is omitted.

In the drawings, arrows Fr and Rr indicate vehicle front and rear directions. The arrow Fr indicates a vehicle front direction, and the arrow Rr indicates a vehicle rear direction. Further, arrows Rh and Lh indicate vehicle width directions. The arrow Rh indicates a vehicle right direction, and the arrow Lh indicates a vehicle left direction. In addition, an upper direction in the drawing will be called a vehicle upper direction, and a lower direction in the drawing will be called a vehicle lower direction.

Figure 2:
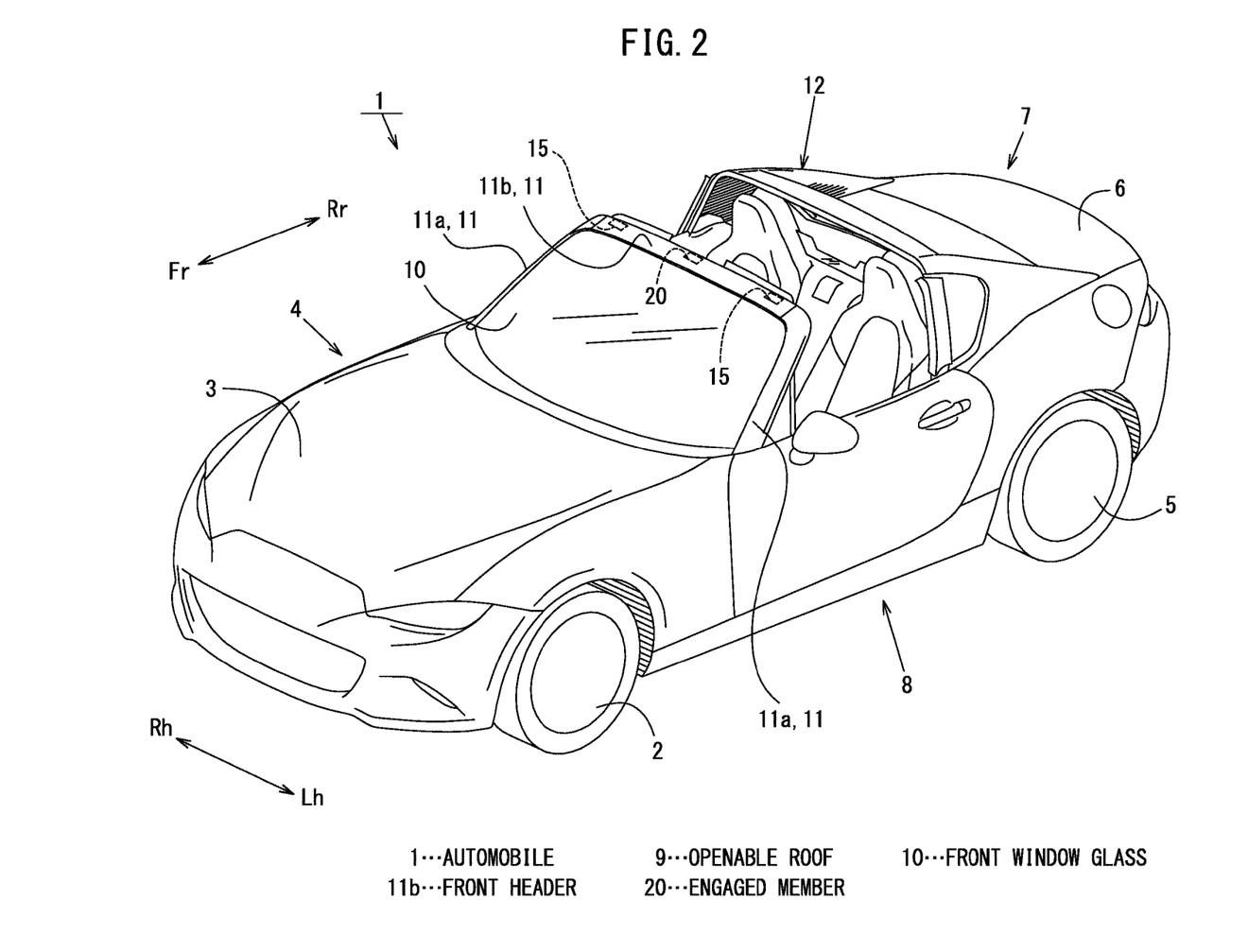
FIG. 2 is an external perspective view showing the automobile in a state that the openable roof is open.

As shown in FIGS. 1 and 2, the automobile 1 includes a vehicle front section 4 in which front wheels 2 and a hood 3 are disposed, a vehicle rear section 7 in which rear wheels 5 and a trunk lid 6 are disposed, and a vehicle interior section 8 which is positioned between the vehicle front section 4 and the vehicle rear section 7 and in which an occupant rides. The automobile 1 is a so-called open car in which a roof portion covering the upper side of the vehicle interior section 8 is configured with the openable roof 9.

As shown in FIGS. 1 and 2, the openable roof 9 of the automobile 1 includes a roof front part 9a mountably to and dismountably from the upper part of a window frame member 11 supporting a front window glass 10 in the upper part of the vehicle interior section 8, and a roof rear part 9b positioned behind the roof front part 9a.

The roof front part 9a and the roof rear part 9b, the details of which are not shown, are configured with a plurality of metal panels bonded integrally.

The openable roof 9 is stored to be folded in a storage space S provided below a deck cover 12 which is positioned behind the vehicle interior section 8 and which has a substantially gate shape in a front view.

Specifically, as shown in FIG. 3, the openable roof 9 is configured such that after the deck cover 12 automatically moves in a vehicle rear upper direction by an occupant switch operation, the roof front part 9a and the roof rear part 9b separated in the vehicle front and rear directions are automatically stored in the storage space S in the vehicle rear direction so as to be folded together with a rear window glass 13.

Further, in the front end of the roof front part 9a, the details of which are not shown, positioning members 14 projected toward the vehicle front direction are disposed on both ends of the vehicle width direction (refer to FIG. 1). The positioning members 14 are formed to be insertable to positioning bases 15 of a front header 11b described later, from the vehicle rear direction.

As shown in FIGS. 1 and 2, the window frame member 11 includes a pair of left and right front pillars 11a supporting both ends of the vehicle width direction of the front window glass 10, and the front header 11b for coupling the upper part of the front pillar 11a in the vehicle width direction and for supporting the upper end of the front window glass 10.

To the rear end of the front header 11b, a weather strip rubber 16 (refer to FIG. 4) for closing the gap with the front end of the openable roof 9 is mounted along the vehicle width direction.

Further, in the front header 11b, the details of which are not shown, the positioning bases 15 inserted with the positioning members 14 of the roof front part 9a are disposed on both ends in the vehicle width direction (refer to FIGS. 1 and 2). The positioning bases 15 regulate the movement of the openable roof 9 in the vehicle width direction, by being inserted with the positioning members 14 of the openable roof 9 when the openable roof 9 is closed.

As shown in FIGS. 1 and 2, the automobile 1 includes, at a substantially center in the vehicle width direction, an openable roof lock structure as a coupling part for coupling and fixing the openable roof 9 with the front header 11b when the openable roof 9 is closed. The openable roof lock structure includes the engaged member 20 provided in the front header 11b, and the automatic lock device 30 attachable to and detachable from the engaged member 20.

Next, the engaged member 20 and the automatic lock device 30 in the present embodiment will be described in more detail with reference to FIGS. 4 to 7.

Figure 4:
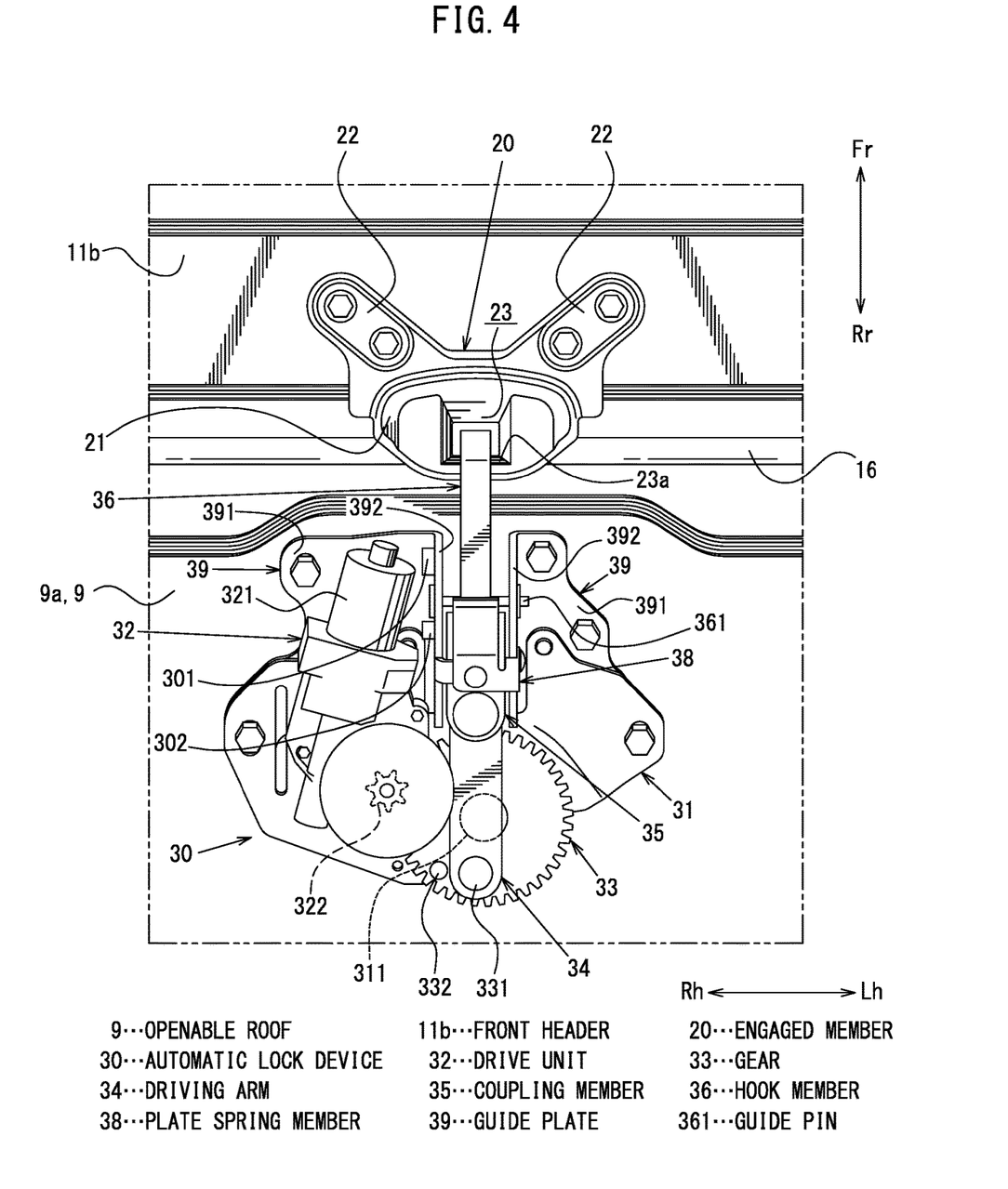
FIG. 4 is a bottom view showing a bottom surface of a roof lock structure in an engaged state.
Figure 5:
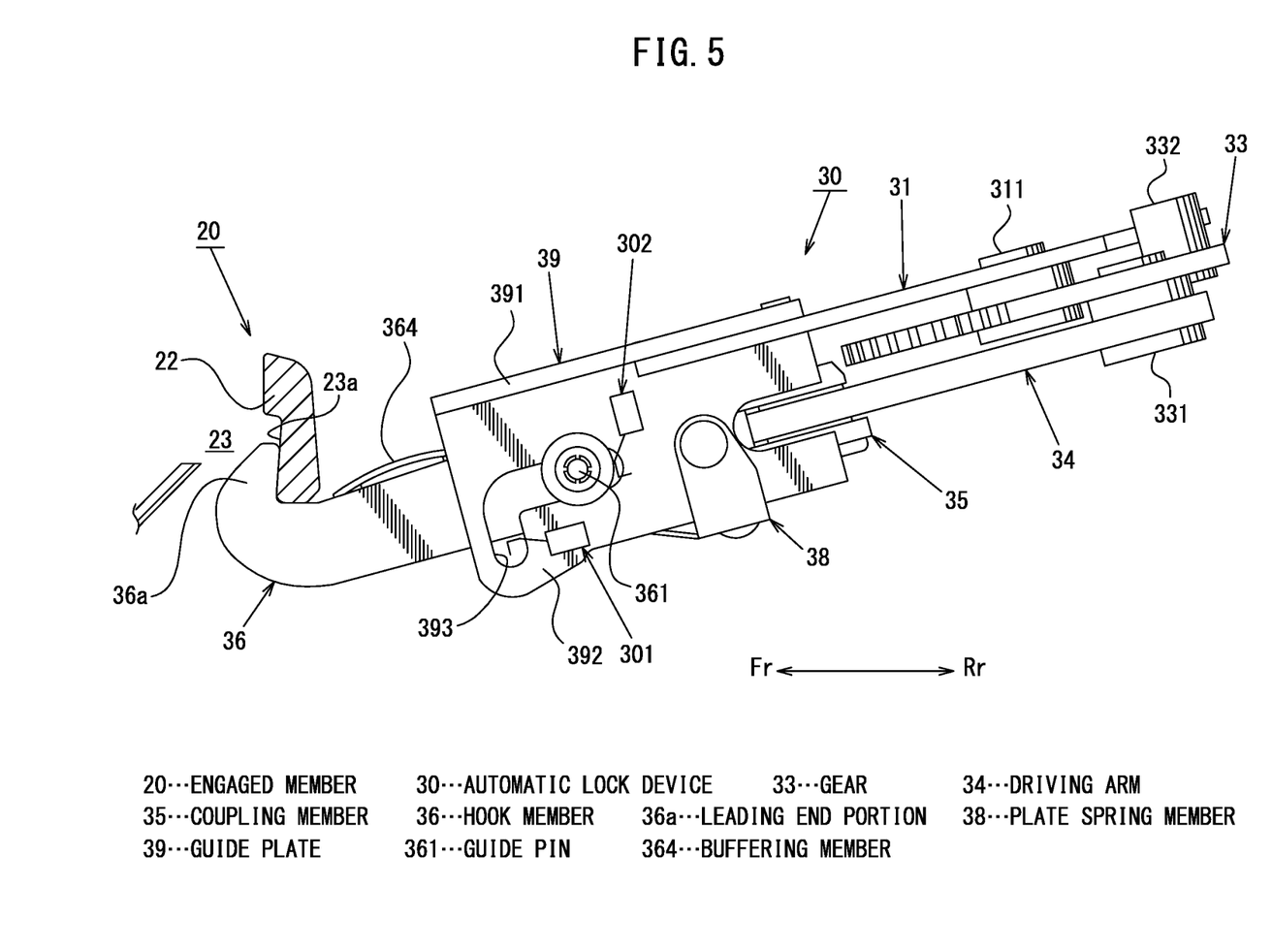
FIG. 5 is a left side view showing a left side surface of the roof lock structure in the engaged state.
Figure 6:
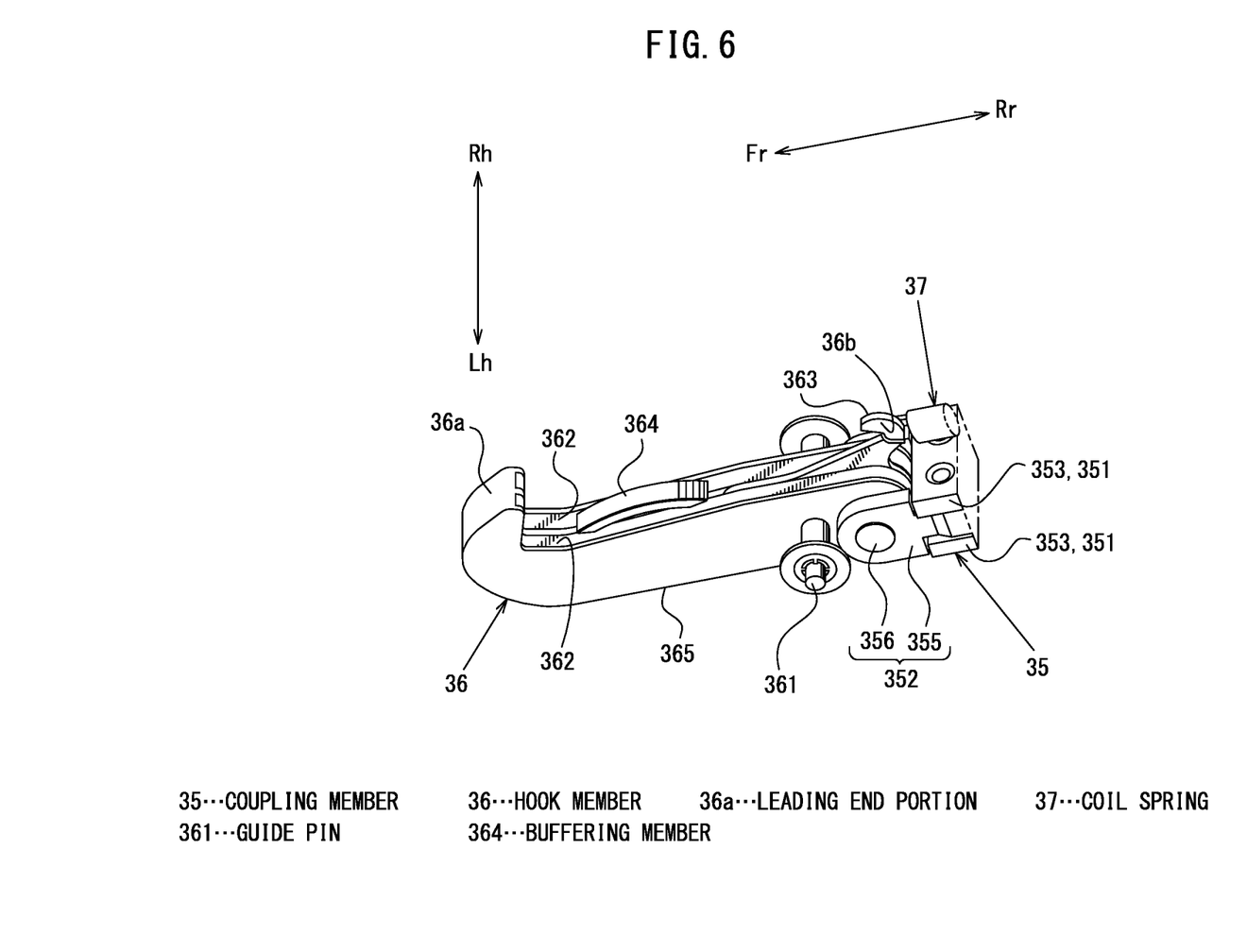
FIG. 6 is an external perspective view showing an appearance of a main part in an automatic lock device.
Figure 7:
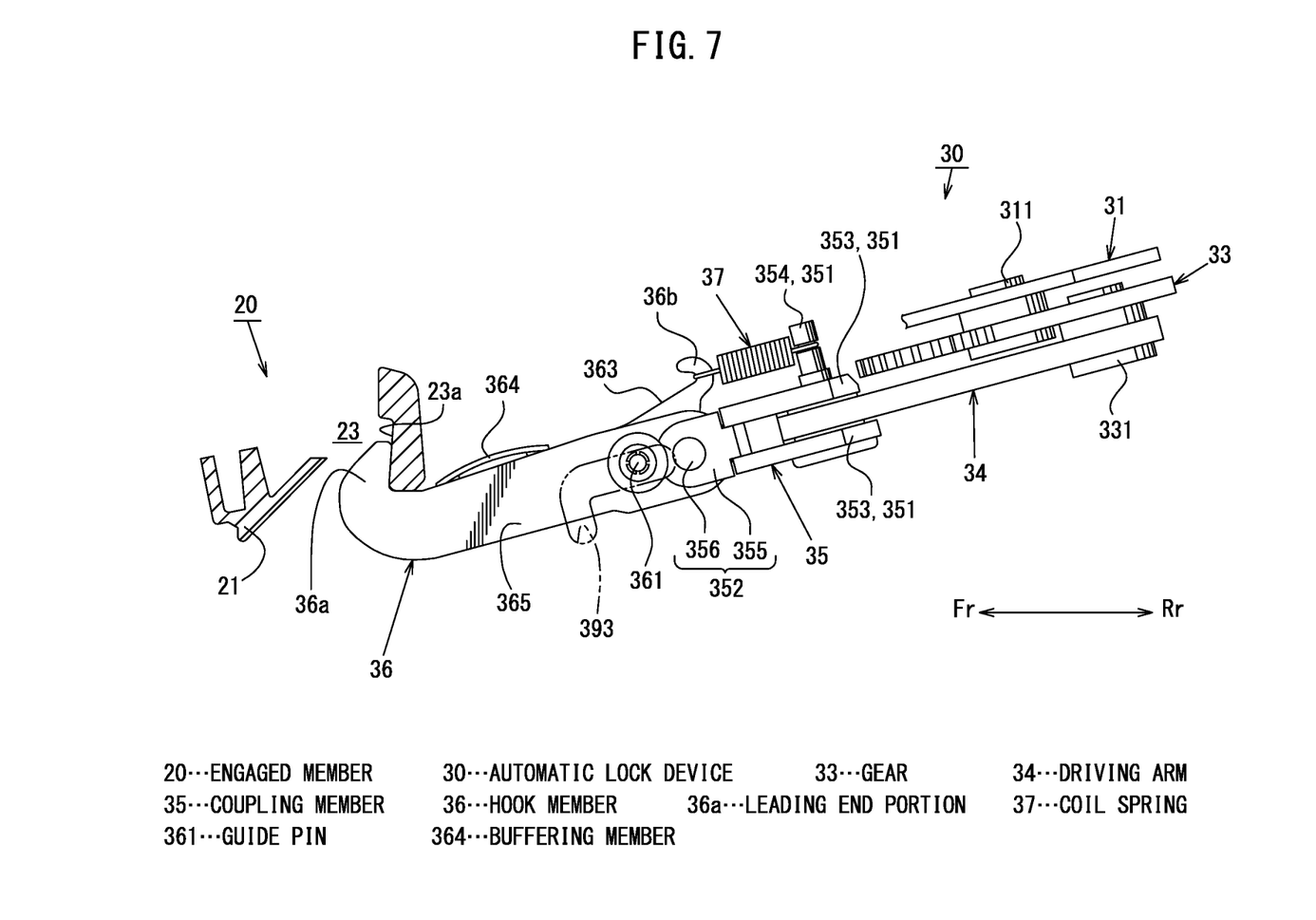
FIG. 7 is a left side view showing a main part of the roof lock structure in the engaged state.

FIG. 4 is a bottom view showing a bottom surface of the roof lock structure in an engaged state. FIG. 5 is a left side view showing a left side surface of the roof lock structure in the engaged state. FIG. 6 is an external perspective view showing the main part in the automatic lock device 30. FIG. 7 is a left side view showing the main part of the roof lock structure in the engaged state.

In FIG. 5, in order to make clear the main part, the front header 11b, the roof front part 9a, and the drive unit 32 are omitted in the drawing, and only the engaged member 20 is shown by the sectional view. Further, in FIG. 7, in order to make clear the main part, the drive unit 32, guide plates 39, and a stopper unit 332 are omitted in the drawing, and only the engaged member 20 is shown by the sectional view.

As shown in FIG. 4, the engaged member 20 is fastened and fixed to a lower surface at a substantially center in the vehicle width direction of the front header 11b in the bottom view. The engaged member 20 is integrally formed by a body part 21 with which the automatic lock device 30 is engaged, and a pair of left and right leg parts 22 extensively provided from the front end of the body part 21 to an outer side in the vehicle width direction and also to the vehicle front direction.

The body part 21 is disposed at a position superposed with the rear end of the front header 11b and the weather strip rubber 16 in the bottom view. The body part 21 has an engaging hole 23 opened so as to be recessed in the vehicle upper direction.

The front surface portion which is recessed by the engaging hole 23 is formed to have a substantially vertical plane with which an automatic lock device 30 (a hook member 36 describe later) can be abutted, as shown in FIG. 5. The substantially vertical plane abutted with the automatic lock device 30 is defined as an abutted surface 23a in the engaged member 20.

The leg parts 22 can be abutted with the lower surface of the front header 11b, and are also fastened and fixed to the lower surface of the front header 11b.

In the meantime, as shown in FIG. 4, the automatic lock device 30 includes a base plate 31 fastened and fixed to the front-end lower surface of the roof front part 9a, the drive unit 32 fixed to the base plate 31, a gear 33 pivotally supported by the base plate 31, a driving arm 34 which has one end pivotally supported by the gear 33, the hook member 36 coupled to the other end side of the driving arm 34 via the coupling member 35 and engaged with the engaged member 20, a coil spring 37 (refer to FIG. 7) and a plate spring member 38 for biasing the hook member 36, and a pair of left and right guide plates 39 for guiding movement of the hook member 36.

The automatic lock device 30 is configured to be attachable to and detachable from the engaged member 20, by the hook member 36 sliding in substantially vehicle front and rear directions and turning in the vehicle upper and lower directions.

More specifically, as shown in FIGS. 4 and 5, the base plate 31 has a predetermined thickness in substantially vehicle upper and lower directions, and is formed in a substantially flat plate shape wide in the vehicle width direction. The base plate 31 is fastened and fixed to the lower surface of the roof front part 9a.

Further, the rear end of the vehicle right-side portion of the base plate 31 is formed to be able to regulate the turning of the gear 33 in the clockwise direction in the bottom view, in the engaged state that the hook member 36 is engaged with the engaged member 20. On the other hand, the rear end of the vehicle left-side portion of the base plate 31 is formed to be able to regulate the turning of the gear 33 in the counter-clockwise direction in the bottom view, in the state that the hook member 36 is disengaged from the engaged member 20.

In addition, the base plate 31 has a substantially cylindrical gear shaft part 311 for rotatably pivotally supporting the gear 33 having substantially vehicle upper and lower directions as a rotating axis.

As shown in FIG. 4, the gear shaft part 311 is disposed, in the base plate 31, at a position substantially coinciding with a virtual line in the vehicle front and rear directions along a substantially center in the vehicle width direction of the engaging hole 23, in the state that the hook member 36 is engaged with the engaged member 20.

Further, as shown in FIG. 4, the drive unit 32 is disposed and fixed to a vehicle right-side portion of the gear shaft part 311 of the base plate 31. The drive unit 32 is integrally configured by accommodating in a housing (not shown) the electrically driven drive motor 321 and a worm gear (not shown) turning by the driving force of the drive motor 321.

Then, the drive unit 32 is configured to covert, by the worm gear, the rotation of the drive motor 321 having substantially vehicle front and rear directions as a rotating axis, to a rotation having substantially vehicle upper and lower directions as a rotating axis.

More specifically, the worm gear of the drive unit 32 includes a worm (not shown) provided in the output shaft of the drive motor 321, and a worm wheel (not shown) pivotally supported by the housing having substantially vehicle upper and lower directions as a rotating axis. Further, in the worm wheel of the drive unit 32, there is integrally formed a drive gear 322 (refer to FIG. 4) meshed with the gear 33 in a smaller diameter than that of the worm wheel.

The drive gear 322 is integrally formed with the worm wheel on the axis substantially same as the rotation center of the worm wheel, at a position on the vehicle upper side of the worm wheel. The drive gear 322 is exposed from the housing of the drive unit 32.

Further, as shown in FIGS. 4 and 5, the gear 33 is a substantially circular flat plate in the bottom view having a predetermined thickness in the upper and lower directions. A center portion of the gear 33 is rotatably pivotally supported by the gear shaft part 311 having substantially vehicle upper and lower directions as a rotating axis. In the gear 33, a plurality of teeth in sizes meshed with the drive gear 322 are formed along a peripheral direction.

The gear 33 includes a substantially cylindrical arm shaft part 331 rotatably pivotally supporting the driving arm 34 having substantially vehicle upper and lower directions as a rotating axis, and the stopper unit 332 which has a substantially cylindrical shape and is abutted with the base plate 31.

As shown in FIGS. 4 and 5, the arm shaft part 331 is in a substantially cylindrical shape extending in substantially vehicle upper and lower directions, and is provided on the lower surface of the gear 33.

The arm shaft part 331 is disposed in a vehicle rear direction from the gear shaft part 311 and at a position substantially coinciding with a virtual line in the vehicle front and rear directions along the substantially center in the vehicle width direction of the engaging hole 23, in the state that the hook member 36 is engaged with the engaged member 20.

As shown in FIGS. 4 and 5, the stopper unit 332 is in a substantially cylindrical shape extending in substantially vehicle upper and lower directions and having a length enough for abutting with the base plate 31, and is provided on the upper surface of the gear 33. The stopper unit 332 is disposed in the vehicle right side position of the arm shaft part 331, in the engaged state that the hook member 36 is engaged with the engaged member 20.

Further, as shown in FIGS. 4 and 5, the driving arm 34 is in a substantially flat plate shape having a predetermined thickness in the vehicle upper and lower directions and having a length larger than the diameter of the gear 33 in the vehicle front and rear directions. The rear end of the driving arm 34 is rotatably pivotally supported by the arm shaft part 331 having substantially vehicle upper and lower directions as a rotating axis.

As shown in FIGS. 6 and 7, the coupling member 35 integrally configures an arm coupling part 351 for rotatably pivotally supporting the driving arm 34 having substantially vehicle upper and lower directions as a rotating axis, and a hook coupling part 352 for rotatably pivotally supporting the rear end of the hook member 36 having a vehicle width direction as a rotating axis, in this order from the vehicle rear direction.

More specifically, as shown in FIGS. 6 and 7, the arm coupling part 351 includes a pair of flat plate parts 353 opposite to each other with a predetermined interval in substantially vehicle upper and lower directions, and an arm shaft part 354 provided in the rear part of the pair of flat plate parts 353 and having substantially vehicle upper and lower directions as an axial direction.

The pair of flat plate parts 353 are in a flat plate shape having a predetermined thickness in substantially vehicle upper and lower directions, and each flat plate part 353 is formed in substantially the same shape.

The arm shaft part 354 is formed in a substantially cylindrical shape larger than the length in substantially vehicle upper and lower directions of the pair of flat plate parts 353. Further, the arm shaft part 354 is mounted and fixed to the pair of flat plate parts 353 so that the upper end of the arm shaft part 354 is projected in the vehicle upper direction of the flat plate part 353 on the vehicle upper side.

On the portion, projected in the vehicle upper direction of the flat plate part 353, of the arm shaft part 354, there is latched the rear end of the coil spring 37 biasing the hook member 36 to the vehicle rear direction.

As shown in FIGS. 6 and 7, the hook coupling part 352 includes a hook coupling body 355 in a substantially gate shape in a bottom view of which the vehicle front side is opened, and a hook shaft part 356 provided at a front part of the hook coupling body 355 and having the vehicle width direction as an axial direction.

The hook coupling body 355 is formed in such a shape that the rear end of the hook coupling body 355 is sandwiched by the front parts of the pair of flat plate parts 353.

The hook shaft part 356 is in a substantially cylindrical shape extending in the vehicle width direction, and is mounted and fixed to the front part of the hook coupling body 355.

Further, as shown in FIGS. 4 to 6, the hook member 36 is formed in a substantially peg shape having, in the front end, a leading end portion 36a projected in the vehicle upper direction, and abutted with an abutted surface 23a in the engaging hole 23 of the engaged member 20 from the vehicle front side.

The hook member 36 has, in the rear part thereof, a hook shaft piercing hole (not shown) through which the hook shaft part 356 of the coupling member 35 is pierced, and a guide pin 361 extending to the outer side in the vehicle width direction on the vehicle front side of the hook piercing hole. Further, the hook member 36 has, in the rear part thereof, a spring latch portion 36b extending to the vehicle upper rear direction and for latching the front end of the coil spring 37.

More specifically, as shown in FIGS. 6 and 7, the hook member 36 includes a pair of left and right body flat plates 362 opposite to each other in the vehicle width direction, a sprig latch plate 363 present in the rear part between the body flat plates 362, a synthetic resin buffering member 364 present in the front part between the body flat plates 362, a synthetic resin cover body 365 integrally covering the pair of left and right body flat plates 362, and a guide pin 361 exposed from the cover body 365 to an outer side in the vehicle width direction.

The pair of left and right body flat plates 362 are metal flat plates in a substantially peg shape in the side view having a predetermined thickness in the vehicle width direction, and are formed in substantially the same shapes.

The sprig latch plate 363 is a metal flat plate having a predetermined thickness in the vehicle width direction, and is formed in a shape having, in the rear end, a substantially peg shape spring latch portion 36b extending toward the vehicle upper rear direction.

The buffering member 364 is sandwiched by the pair of left and right body flat plates 362 on the vehicle rear side of the leading end portion 36a of the hook member 36.

More specifically, the buffering member 364 is not in contact with the engaged member 20 in the state that the leading end portion 36a is abutted with the abutted surface 23a of the engaged member 20. The buffering member 364 is disposed at a position where the buffering member 364 is in contact with the lower surface of the engaged member 20, at a position where the leading end portion 36a is separated from the abutted surface of the engaged member 20 to the vehicle front side.

The buffering member 364 is formed to have a portion sandwiched between the pair of left and right body flat plates 362, and a portion exposed in the vehicle upper direction of the body flat plates 362. In the buffering member 364, the portion exposed from the body flat plates 362 are in a substantially arc shape bent to be projected in the vehicle upper direction and having elasticity in substantially vehicle upper and lower directions.

The cover body 365 is formed in a shape integrally covering the upper surfaces of the pair of left and right body flat plates 362 and the rear surface of the leading end portion 36a continuous from the upper surface, that is, portions excluding the contact surface with the engaging hole 23.

The guide pin 361 is in a substantially cylindrical shape extending in the vehicle width direction, and is formed in a length enough for piercing through a guide groove part 393 of the guide plate 39. The guide pin 361 is rotatably pierced in the body flat plates 362, the sprig latch plate 363, and the cover body 365.

Further, as shown in FIG. 4, in the bottom view, the pair of left and right guide plates 39 include a left-side plate fixed to the upper surface of the vehicle left-side portion of the base plate 31, and a right-side plate fixed to the upper surface of the vehicle right-side portion of the base plate 31 by sandwiching the hook member 36.

The left-side plate and the right-side plate are disposed with an interval for a sliding movement of the hook member 36 in substantially vehicle front and rear directions.

As shown in FIGS. 4 and 5, the pair of left and right guide plates 39 are integrally formed by a plate base part 391 fixed to the lower surface of the roof front part 9a and the upper surface of the base plate 31, and a vertical wall part 392 extended in a vehicle lower direction from an inner side end part in the vehicle width direction of the plate base part 391.

As shown in FIGS. 5 and 7, the vertical wall part 392 has a guide groove part 393 through which the guide pin 361 of the hook member 36 is pierced and which guides movement of the hook member 36.

The guide groove part 393 is formed in a substantially L shape in the side view and is integrally formed by an elliptical-shape opening long in substantially upper and lower directions in the side view, and an elliptical-shape opening extended from the upper part of the elliptical-shape opening to a substantially vehicle rear direction. The guide groove part 393 is integrally formed by combining elliptical-shape openings each having a larger external diameter than the external diameter of the guide pin 361.

In addition, as shown in FIGS. 4 and 5, in the vertical wall part 392 of the guide plate 39, there are provided, contactably with the guide pin 361, an advanced-position detection sensor 301 that detects an advanced position of the hook member 36, and a retreated-position detection sensor 302 that detects a retreated position of the hook member 36.

As shown in FIG. 4 and FIG. 5, the pair of left and right guide plates 39 include the metal plate spring member 38 mounted and fixed to the left and right vertical wall parts 392, and for biasing the lower surface of the hook member 36 to the vehicle upper side between the left and right vertical wall part 392.

The automatic lock device 30 in such a configuration forms a reciprocating slider/crank mechanism for converting a rotation operation of the gear 33 having substantially vehicle upper and lower directions as a rotating axis into a reciprocating sliding operation of the hook member 36 along the guide groove part 393, by the gear 33, the driving arm 34, the coupling member 35, the guide pin 361, the guide plate 39, the coil spring 37, and the plate spring member 38.

Next, there will be described in detail with reference to FIGS. 8 and 9, the operation of the automatic lock device 30 when the openable roof 9 is started to be stored in the storage space S by the switch operation of the occupant, and the operation of the automatic lock device 30 when the openable roof 9 is closed by the switch operation of the occupant.

Figure 8:
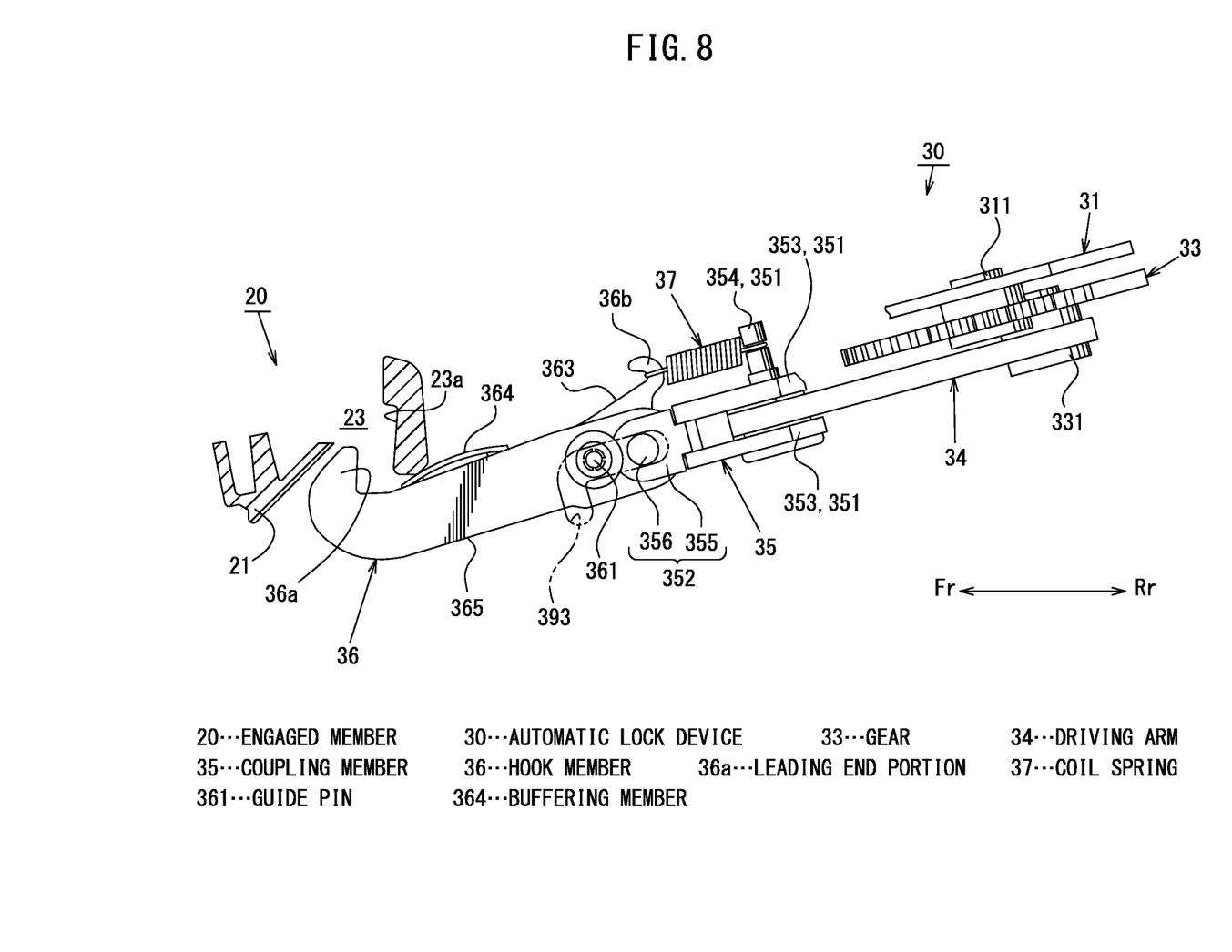
FIG. 8 is a left side view showing the main part of the roof lock structure in an attachment and detachment process.

FIG. 8 is a left side view showing the main part of the roof lock structure in an attachment and detachment process. FIG. 9 is a left side view showing the main part of the roof lock structure in an engagement cancel state.

Figure 9:
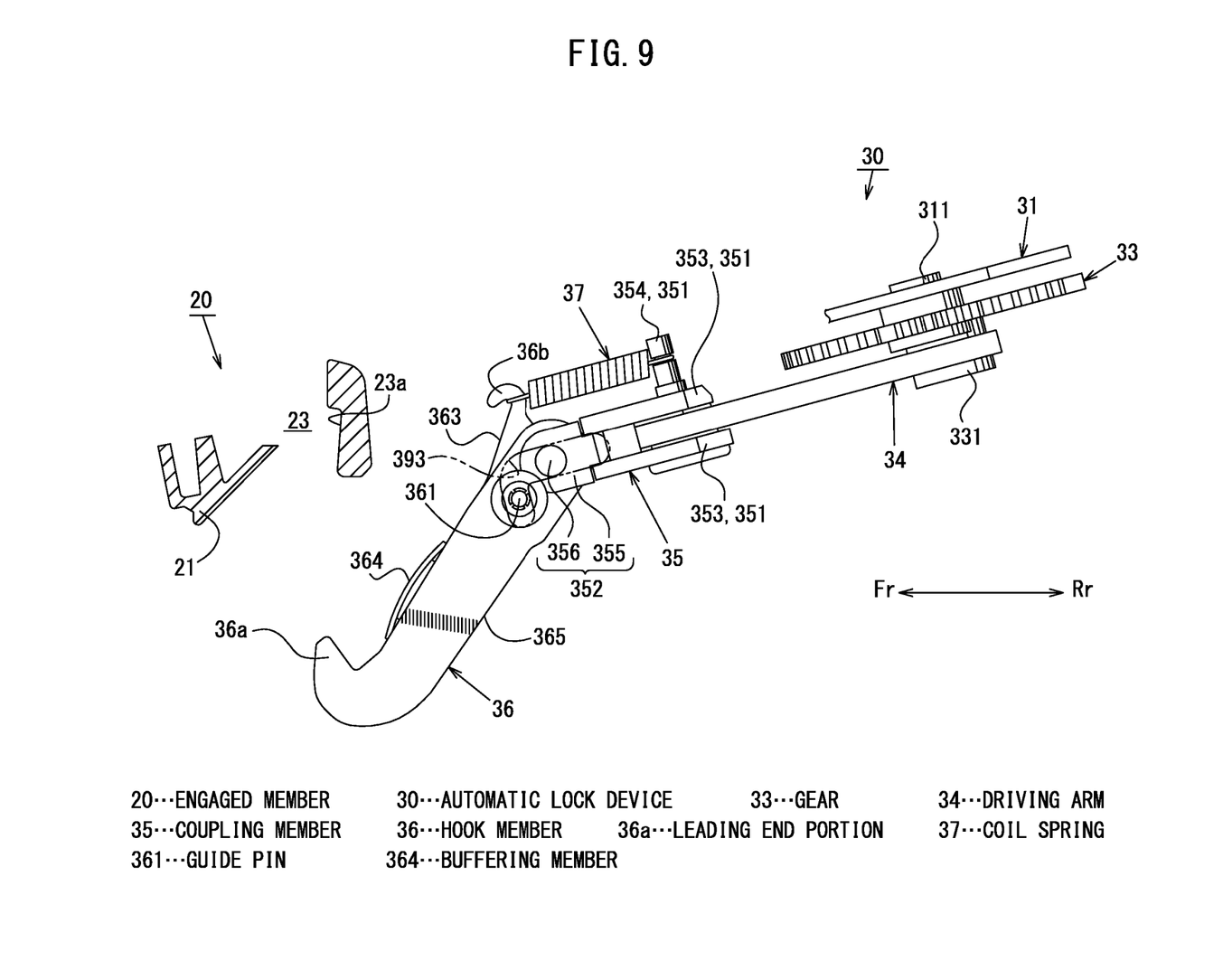
FIG. 9 is a left side view showing the main part of the roof lock structure in an engagement cancel state.

In FIGS. 8 and 9, in order to make clear the main part, the drive unit 32, the guide plate 39, and the stopper unit 332 are omitted in the drawings, and only the engaged member 20 is shown by the sectional views.

First, as shown in FIG. 3, in the state that the openable roof 9 is closed, when the deck cover 12 is started to be moved in the vehicle upper rear direction by the switch operation of the occupant, the drive motor 321 of the automatic lock device 30 starts turning.

When the gear 33 is started to be turned in the counter-clockwise direction in the bottom view, as shown in FIGS. 7 and 8, by the reciprocating slider/crank mechanism, the automatic lock device 30 slides the hook member 36 to the vehicle front side, along the elliptical-shaped opening portion long in substantially front and rear directions in the guide groove part 393. In this case, the hook member 36 slides against the biasing force of the coil spring 37.

When the turning of the gear 33 in the counter-clockwise direction in the bottom view further proceeds and the guide pin 361 moves to the elliptical-shaped opening portion long in substantially upper and lower directions in the guide groove part 393, the automatic lock device 30 turns the hook member 36 having the hook shaft part 356 as a turning axis, in a vehicle lower direction along the elliptical-shaped opening portion long in substantially upper and lower directions, as shown in FIGS. 8 and 9. In this case, the hook member 36 turns in the vehicle lower direction against the biasing force of the coil spring 37 and the plate spring member 38. In this way, the automatic lock device 30 disengages the hook member 36 from the engaged member 20.

On the other hand, when the openable roof 9 stored in the storage space S is closed by the switch operation of the occupant, the drive motor 321 of the automatic lock device 30 starts a counter-rotation driving at the timing when the positioning member 14 is inserted into the positioning base 15 of the front header 11b.

Then, when the gear 33 starts to turn in the clockwise direction in the bottom view, the hook member 36 is applied with a tension load in the vehicle rear direction via the driving arm 34 and biasing force of the coil spring 37 and the plate spring member 38.

Therefore, as shown in FIGS. 8 and 9, the hook member 36 energetically turns in the vehicle upper direction along the elliptical-shaped opening portion long in substantially upper and lower directions in the guide groove part 393 with the hook shaft part 356 being as a rotating axis, and is abutted with the rear lower surface of the engaged member 20 via the buffering member 364, from the vehicle lower direction.

When the turning of the gear 33 in the clockwise direction in the bottom view further proceeds and the guide pin 361 moves to the upper part of the elliptical-shaped opening portion long in substantially upper and lower directions in the guide groove part 393, by the reciprocating slider/crank mechanism, the automatic lock device 30 slides the hook member 36 to the vehicle rear side along the elliptical-shaped opening portion long in substantially front and rear directions in the guide groove part 393, as shown in FIGS. 7 and 8.

In this case, the tension load in the vehicle rear direction via the driving arm 34 and the biasing force of the coil spring 37 and the plate spring member 38 continuously work, and the buffering member 364 is formed in a substantially arc shape in the side view. Therefore, the hook member 36 smoothly slides in the vehicle rear direction while maintaining the contact state between the lower surface of the engaged member 20 and the buffering member 364.

Thereafter, as shown in FIG. 7, the hook member 36 has the leading end portion 36a abutted with the abutted surface 23a of the engaged member 20. In this way, the automatic lock device 30 engages the hook member 36 with the engaged member 20.

The openable roof lock structure and openable roof lock method for the automobile 1, for realizing the above operation can suppress misalignment of the openable roof 9 with respect to the vehicle body and a noise due to contact with the engaged member 20.

Specifically, when the hook member 36 having started to turn in the vehicle upper direction is engaged with the engaged member 20, there occur a noise due to contact of the hook member 36 turning in the vehicle upper direction with the engaged member 20 and a noise due to the engagement of the leading end portion 36a of the hook member 36 with the engaged member 20.

The noise due to contact of the hook member 36 turning in the vehicle upper direction with the engaged member 20 easily becomes larger than the noise due to the engagement of the leading end portion 36a with the engaged member 20. Consequently, discomfort given to the occupant easily becomes large.

In the state that the leading end portion 36a is not engaged with the engaged member 20, by the buffering member 364 abutted with the engaged member 20, the openable roof lock structure for the automobile 1 and the openable roof lock method for the automobile 1 can absorb the shock when the hook member 36 turning in the vehicle upper direction comes into contact with the engaged member 20.

Accordingly, the openable roof lock structure for the automobile 1 and the openable roof lock method for the automobile 1 can suppress the occurrence of a noise due to the contact between the turning hook member 36 and the engaged member 20. In this case, the noise due to the engagement of the leading end portion 36a with the engaged member 20 is audible to the occupant. However, the openable roof lock structure for the automobile 1 and the openable roof lock method for the automobile 1 can notify the occupant that the vehicle body and the openable roof 9 are completely coupled together, by the noise.

Further, in the state that the leading end portion 36a is not engaged with the engaged member 20, the buffering member 364 comes into contact with the engaged member 20. Therefore, the buffering member 364 is not in contact with the engaged member 20 in the state that the engaged member 20 and the leading end portion 36a are engaged together.

Accordingly, the openable roof lock structure for the automobile 1 and the openable roof lock method for the automobile 1 can prevent the buffering member 364 from being always pressed, in the engaged state that the engaged member 20 and the hook member 36 are engaged together. Accordingly, the openable roof lock structure for the automobile 1 and the openable roof lock method for the automobile 1 can suppress the occurrence of a fatigue and the like in the buffering member 364.

In addition, the leading end portion 36a of the hook member 36 and the engaged member 20 are in direct contact with each other. Therefore, the openable roof lock structure for the automobile 1 and the openable roof lock method for the automobile 1 can stabilize the relative position of the openable roof 9 with respect to the vehicle body even when the openable roof 9 is repeatedly opened and closed.

Therefore, the openable roof lock structure for the automobile 1 and the openable roof lock method for the automobile 1 can suppress misalignment of the openable roof 9 with respect to the vehicle body and a noise due to contact with the engaged member 20.

Further, even when the engaged member 20 is fixed to the front header 11b supporting the upper part of the front window glass 10 and the automatic lock device 30 is fixed to the front end of the openable roof 9, since the openable roof lock structure for the automobile 1 can suppress a noise generated at a position near the occupant, it is possible to prevent a discomfort from being given to the occupant.

Further, there is provided the reciprocating slider/crank mechanism for engaging the leading end portion 36a with the engaged member 20 by turning the hook member 36 in the vehicle upper direction and sliding the hook member 36. Therefore, the openable roof lock structure for the automobile 1 can suppress a noise due to contact between the engaged member 20 and the hook member 36, and can shorten the time required from the start of turning of the hook member 36 till the engagement of the leading end portion 36a with the engaged member 20.

Specifically, by the reciprocating slider/crank mechanism for sliding the hook member 36 while turning the hook member 36 in the vehicle upper direction, the openable roof lock structure for the automobile 1 can continuously perform the process of bringing the hook member 36 in the disengaged state close to the engaged member 20, and the process of engaging the hook member 36, which is close to the engaged member 20, with the engaged member 20.

Accordingly, the openable roof lock structure for the automobile 1 can shorten the time required from the start of turning of the hook member 36 till the engagement of the hook member 36 with the engaged member 20, and can efficiently perform the engagement between the engaged member 20 and the automatic lock device 30.

In this case, the openable roof lock structure for the automobile 1 can make the leading end portion 36a of the hook member 36 abutted with the engaged member 20 while maintaining the state that the buffering member 364 is abutted with the engaged member 20. Therefore, the openable roof lock structure for the automobile 1 can securely prevent the occurrence of a noise due to a repeated contact of the hook member 36 with the engaged member 20.

Further, by providing the coil spring 37 and plate spring member 38 for biasing the hook member 36 in the turning direction which is the vehicle upper direction, the openable roof lock structure for the automobile 1 can more securely maintain the state that the buffering member 364 is abutted with the engaged member 20.

In addition, the turning speed of the hook member 36 becomes faster by the coil spring 37 and the plate spring member 38. Therefore, the openable roof lock structure for the automobile 1 can more shorten the time required from the start of turning of the hook member 36 till the contact of the buffering member 364 with the engaged member 20, and can more efficiently perform the engagement between the engaged member 20 and the automatic lock device 30. Even in such a case, the openable roof lock structure for the automobile 1 can suppress, by the buffering member 364, the noise due to contact with the engaged member 20.

Therefore, the openable roof lock structure for the automobile 1 can suppress, by the reciprocating slider/crank mechanism, a noise due to contact between the engaged member 20 and the hook member 36, and can shorten the time required from the start of turning of the hook member 36 till the engagement of the leading end portion 36a with the engaged member 20.

Further, by providing the drive unit 32, the openable roof lock structure for the automobile 1 can more stably suppress a noise due to contact between the engaged member 20 and the hook member 36, and can more efficiently engage the hook member 36 with the engaged member 20.

Specifically, as the turning speed of the hook member 36 is faster, a noise due to contact of the hook member 36 with the engaged member 20 easily becomes large. Therefore, by the drive unit 32, the openable roof lock structure for the automobile 1 can turn the hook member 36 at a constant turning speed as compared with the case where the occupant manually turns the hook member 36. Accordingly, the openable roof lock structure for the automobile 1 can more stabilize the shock absorption effect by the buffering member 364.

Further, by the drive unit 32, the openable roof lock structure for the automobile 1 can shorten and stabilize the time required from the start of turning of the hook member 36 till the engagement of the leading end portion 36a with the engaged member 20.

Therefore, by the drive unit 32, the openable roof lock structure for the automobile 1 can more stably suppress a noise due to contact between the engaged member 20 and the hook member 36, and can more efficiently engage the hook member 36 with the engaged member 20.

In the relations between the configuration of the present invention and the above embodiment, the openable body and the retractable roof of the present invention correspond to the openable roof 9 of the embodiment.

Hereinafter, in a similar manner, the lock device corresponds to the automatic lock device 30, the openable body lock structure corresponds to the openable roof lock structure, the leading end portion corresponds to the leading end portion 36a, the predetermined turning direction corresponds to the vehicle upper direction, the drive part corresponds to the drive unit 32, the gear 33, the driving arm 34, the coupling member 35, the guide pin 361, the guide plate 39, the coil spring 37, and the plate spring member 38, the window frame member corresponds to the front header 11b, and the engagement mechanism part corresponds to the gear 33, the driving arm 34, the coupling member 35, the guide pin 361, the guide plate 39, the coil spring 37, and the plate spring member 38.

However, the present invention is not limited to only the configuration of the above embodiment, and many configurations can be obtained.

For example, in the above embodiment, although the metal openable roof 9 is used, the openable roof is not limited to the metal openable roof. A synthetic resin openable roof or an openable roof configured with hood cloth or a top bow may be used.

Further, there is provided the lock structure for coupling and fixing the front header 11b and the openable roof 9; however, the present invention is not limited to this structure. For example, there may be provided a lock structure for coupling and fixing the vehicle body and the deck cover 12, or a lock structure for coupling and fixing the sliding door covering an opening of the vehicle body side surface and the vehicle body.

Further, the front header 11b includes the engaged member 20 and the openable roof 9 includes the automatic lock device 30; however, the present invention is not limited to this configuration. The front header 11b may include the automatic lock device 30, and the openable roof 9 may include the engaged member 20.

Further, the automatic lock device 30 engages the hook member 36 with the engaged member 20 by the driving force of the drive unit 32; however, the present invention is not limited to this configuration. For example, there may be provided a manual lock device which turns by receiving the operation of the occupant, and the link mechanism for engaging the hook member 36 with the engaged member 20 in conjunction with the turning of the operating lever.

Further, there is provided the automatic lock device 30 in which the hook member 36 slides in the vehicle rear direction after turning in the vehicle upper direction; however, the present invention is not limited to this configuration. The automatic lock device 30 may be configured such that the hook member 36 slides in the vehicle rear direction while turning in the vehicle upper direction.

Positional relationships between the hook member and the engaged member in the vehicle upper and lower directions, the vehicle front and rear directions, and the vehicle width direction, and the engaging direction of the hook member with respect to the engaged member are not limited to the present embodiment, and may be in appropriate configurations.

Further, the buffering member is the synthetic resin buffering member 364 having elasticity; however, the present invention is not limited to this configuration. There may be provided a synthetic rubber buffering member having elasticity, a buffering member configured with a metal plate spring, or a buffering member configured with a member having low resilience such as urethane.

Further, there may be provided an elastic buffering part having low rigidity by providing a hollow portion in a corresponding part of the hook member abutted with the engaged member 20, in the state that the leading end portion 36a is not engaged with the engaged member 20.

Further, the automatic lock device 30 includes the coil spring 37 and the plate spring member 38 for biasing the hook member 36; however, the present invention is not limited to this configuration. The hook member 36 may be biased by a biasing part different from the coil spring 37 and the plate spring member 38. Alternatively, there may be provided an automatic lock device not including the coil spring 37 and the plate spring member 38.

DESCRIPTION OF SYMBOLS

1 AUTOMOBILE
9 OPENABLE ROOF
10 FRONT WINDOW GLASS
11b FRONT HEADER
20 ENGAGED MEMBER
30 AUTOMATIC LOCK DEVICE
32 DRIVE UNIT
33 GEAR
34 DRIVING ARM
35 COUPLING MEMBER
36 HOOK MEMBER
36a LEADING END PORTION
37 COIL SPRING
38 PLATE SPRING MEMBER
39 GUIDE PLATE
361 GUIDE PIN
364 BUFFERING MEMBER

What is claimed is:

1. An openable body lock structure for an automobile, comprising:

an engaged member fixed to one of a vehicle body and an openable body openably and closably covering an opening of the vehicle body; and a lock device fixed to the other one of the vehicle body and the openable body, and attachable to and detachable from the engaged member, wherein the lock device includes:
a substantially peg-shaped hook member having a leading end portion in one end, the leading end portion to be engaged with the engaged member; and
a drive part to which the other end of the hook member is coupled, the drive part turning the hook member in a predetermined turning direction to engage the hook member with the engaged member, and the hook member includes a buffering part which has elasticity and is abutted with the engaged member in the predetermined turning direction,
wherein the buffering part is disposed at a position where the buffering part is in contact with a lower surface of the engaged member, if the leading end portion is separated from the abutted surface of the engaged member to a vehicle front side, so that, in a first state that the leading end portion is not engaged with the engaged member, the buffering member comes into contact with the engaged member, and, in a second state that the engaged member and the leading end portion are engaged together, the buffering member is not in contact with the engaged member.

2. The openable body lock structure for an automobile according to claim 1, wherein the openable body is formed of a retractable roof openably and closably covering an opening of an upper portion of a vehicle, the retractable roof being retractable to the vehicle body, the engaged member is fixed to a window frame member supporting an upper portion of a front window glass, and the lock device is fixed to a front end of the retractable roof.

3. The openable body lock structure for an automobile according to claim 1, wherein the drive part includes an engagement mechanism part that engages the leading end portion with the engaged member by turning the hook member in the predetermined turning direction and sliding the hook member.

4. The openable body lock structure for an automobile according to claim 1, wherein the drive part is electrically driven.

5. An openable body lock method for an automobile in an openable body lock structure including an engaged member fixed to one of a vehicle body and an openable body openably and closably covering an opening of the vehicle body, and a lock device fixed to the other one of the vehicle body and the openable body, and attachable to and detachable from the engaged member, the openable body lock method comprising the steps of:
turning, by a drive part of the lock device, a substantially peg-shaped hook member to be engaged with the engaged member, in a predetermined turning direction;
abutting a buffering part which has elasticity and is provided in the hook member, with the engaged member in the predetermined turning direction; and
engaging a leading end portion of the hook member with the engaged member;
wherein the buffering part is disposed at a position where the buffering part is in contact with a lower surface of the engaged member, if the leading end portion is separated from the abutted surface of the engaged member to a vehicle front side, so that, in a first state that the leading end portion is not engaged with the engaged member, the buffering member comes into contact with the engaged member, and, in a second state that the engaged member and the leading end portion are engaged together, the buffering member is not in contact with the engaged member.

* * * * *